April 9, 1968     C. G. BACH, JR     3,376,861

BUILT-IN COOKING APPLIANCE WITH SIDE TRIMMING MEMBERS

Filed Sept. 14, 1966

INVENTOR.
CARL G. BACH JR.
BY Richard L. Caslin

HIS ATTORNEY

United States Patent Office 3,376,861
Patented Apr. 9, 1968

3,376,861
BUILT-IN COOKING APPLIANCE WITH SIDE TRIMMING MEMBERS
Carl G. Bach, Jr., Louisville, Ky., assignor to General Electric Company, a corporation of New York
Filed Sept. 14, 1966, Ser. No. 579,389
4 Claims. (Cl. 126—37)

The present invention relates to appliances that are adapted to be built into a counter structure, and particularly to a cooking appliance for use in the home with means for closing the gap between the side edges of the appliance and the cooperating edge of the countertop.

Built-in kitchen appliances have gained popular acceptance by both the home building industry and by the home buying public. In the range industry, both gas and electric, there are two principal types of built-in appliances. The first type is a separate built-in oven with a separate built-in cooktop comprising a plurality of heating units. The second type is a one-piece built-in range which is usually suspended from the side edges of a notched-out countertop, and it comprises a top cooking surface and a baking oven located beneath the cooktop. A later adaptation of the one-piece built-in range has been a free-standing range which is slid into place in a notched-out countertop, but it is not supported from the counter.

Whenever a cooking appliance is built into a countertop there is a problem of sealing the side edges of the appliance so as to close any gap that might form between the side edge of the appliance and the cooperating edge of the countertop. Moreover, there is frequently a problem at the front edge of the countertop because of the large variety of countertops that are available on the market. Perhaps the most popular type of countertop is a laminated plastic sheet design having a metal trim strip fastened to the front edge thereof. There is also a bull-nose design where the front edge is enlarged and rolled over and under so that no trim strip is necessary. Another treatment would be to have a tile countertop either plastic or ceramic and also a stainless steel countertop. Hence it will be clear that the size and shape of kitchen countertops is not uniform but is varied in number.

The principal object of the present invention is to provide a built-in cooking appliance with a cooperating side flange and mating rail member for closing the gap between the side of the appliance and the adjacent edge of all countertops.

A further object of the present invention is to provide a cooking appliance of the class described where the rail member is a supporting member for the appliance, and the rail member matches the configuration of the side flange of the appliance.

The present invention, in accordance with one form thereof, is embodied in a cooking appliance having a top cooking surface that is furnished with a plurality of heating units mounted therein. The opposite side edges of the cooktop each have an outwardly extending flange and there is a mating rail member in the area beneath each flange. The rail member is adapted to be fixed to the vertical edge of a notched-out or separated section of a counter structure. The top surface of the rail member matches the contour of the underside of the cooperating flange such that no gap is left between the side of the appliance and the countertop which might otherwise serve to collect liquids and crumbs of food.

My invention will be better understood from the following description taken in conjunction with the accompanying drawing and its scope will be pointed out in the appended claims.

Figure 1:
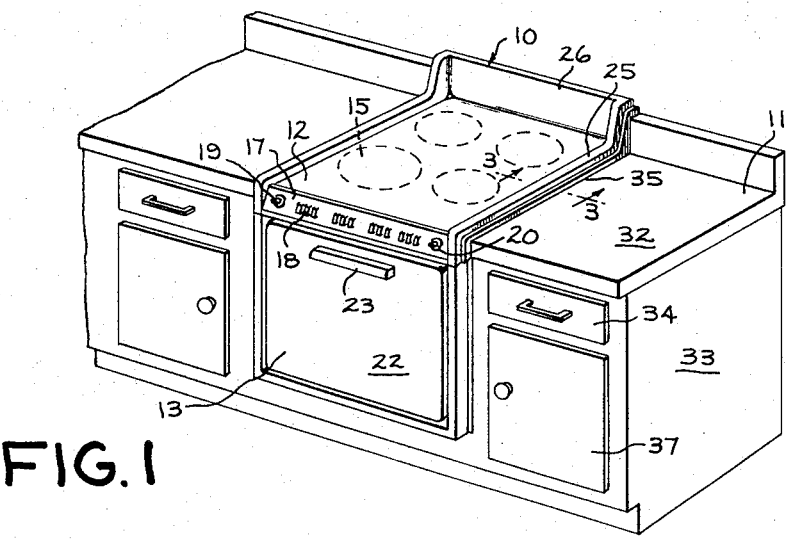
FIGURE 1 is a perspective view of a one-piece built-in range supported in a notched-out counter structure and embodying the present invention.

Turning to a consideration of the drawing, and in particular to FIGURE 1, there is shown for illustrative purposes a one-piece built-in range 10 embodying the present invention and supported in a counter structure 11 of the type that is commonly found in the kitchen of the average home. The range 10 comprises two main elements, a top cooking surface 12 and a baking oven 13 that is located beneath the cooktop. The cooktop 12 is provided with a plurality of heating units 15 which in the case of an electric range would be electric resistance heating units, while in the case of a gas range would be gas burners. The front edge of the cooktop 12 is provided with a control panel 17 supporting a selector switch 18 for each of the four heating units and an oven selector switch 19 and an oven thermostat 20, as is conventional in this art. The baking oven 13 is not fully visible since the range 10 is shown as being built into the counter 11. The only identifiable element of the oven is an oven door 22 which has a handle 23 along its top edge so that the door may be swung down for gaining access to the cooking cavity.

Figure 2:
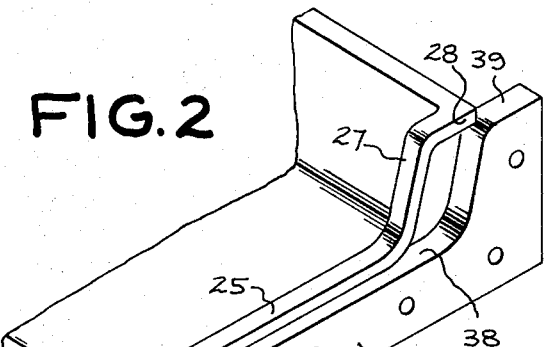
FIGURE 2 is a fragmentary perspective view of the right side edge of the cooking appliance of FIGURE 1 that has been displaced with respect to its mating rail member so as to illustrate the cooperation between the side flange and the rail member.
Figure 3:
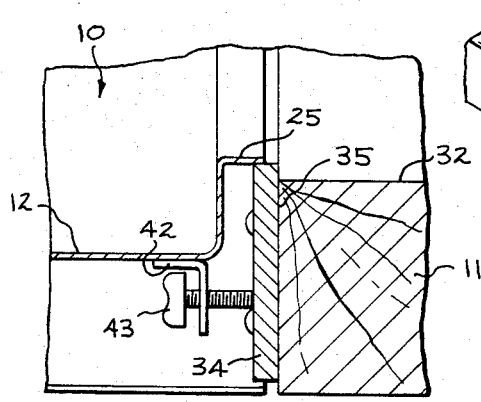
FIGURE 3 is a fragmentary cross-sectional elevational view of the upper, right side of the cooking appliance of FIGURE 1, taken on the line 3—3 of FIGURE 1.

As is best seen in FIGURE 3, the opposite side edges of the cooktop 12 are each provided with an outwardly directed flange 25. Along the back edge of the cooktop 12 is a backsplash 26 which rises vertically from the cooktop. The flange 25 follows the contour of the backsplash in an upwardly and rearwardly inclined angle as at 27 in FIGURE 2, and then it flattens out along the top edge of the backsplash as at 28. At the front end of the flange 25 the flange turns downward as at 30 so as to constitute a rounded corner.

The counter 11 comprises two main elements, namely, a countertop 32 and an underlying cabinet structure 33 which includes such items as the silverware and utensil drawers 34 and the door 37 to the food storage shelves which are present in the average well equipped kitchen arrangement. In the adaptation of FIGURE 1 a section of the countertop 32 is cut out by an amount substantially equal to the width of the cooktop 12 of the range 10. Moreover, the front of the cabinet structure 33 is notched downwardly an amount substantially equal to the height of the range so that the range can be positioned in the counter structure.

The particular range model shown is not designed to be free-standing on the floor, but it is designed to be suspended by the opposite side flanges 25. This invention is considered to be in some respects an improvement over the invention in the earlier patent of William A. Nielsen 3,051,160 which is likewise assigned to the General Electric Company, assignee of the present invention. This range 10 is not adapted to be supported directly from the countertop 32. Instead there is a rail member 34 best seen in FIGURE 2 for mating engagement with the area at the underside of the flange 25 and for mounting to the vertical edge 35 of the notched-out countertop 32. This rail member 34 is provided with a series of nail-receiving openings 36 so that the rail member may be fastened to the said vertical edge 35 by suitable fastening means. The top contour 38 of the rail member including the stepped portion 39 at the rear end thereof and the vertical edge 40 at the front edge thereof are adapted to match the configuration of the underside of the flange 25. Hence, when these rail members 34 are properly positioned, the installer may raise the range until the flanges 25 rest upon the rail members. Then the range may be slid into place until the range is in the final assembled position of FIGURE 1. The rail member 34 would be supplied with the range by the range manufacturer with the range. It would be a decorative metal or plastic member, and it would give the range a definite quality appearance and rugged construction.

Having described above my invention of an improved mounting means for a built-in cooking appliance it will readily be apparent to those skilled in this art that a similar rail member could be adapted for use with a freestanding built-in range where the flange member 25 would not be a supporting member but the cooperation between the flange 25 and the rail member 34 would be the same as explained above.

It is also well to provide a fastening means for holding the range 10 in place after it is finally located. Looking at FIGURE 3 there is an angle bracket 42 that is fastened to the underside of the cooktop 12 and it is adapted to support a fastening screw means 43 which may be tightened to bear against the rail member 34. Access to this fastening screw 43 may be had by raising the surface unit 15 and using the hand to reach under the cooktop.

Modifications of this invention will occur to those skilled in this art therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. A one-piece built-in range comprising a combined cooktop and oven wherein the cooktop is provided with a plurality of heating units mounted therein, and the oven is disposed directly beneath the cooktop, supporting flanges extending outwardly from the side edges of the cooktop, and a supporting rail member for each of the two opposite sides of the range, each rail member being adapted to be fixed to an adjacent vertical side of a countertop and having a top surface configuration which matches the surface contour of the cooperating supporting flange of the cooktop so that the range may be slid into place on the rails into a mating relationship, and adjustable fastening means on the range for engaging the rail members and holding the range in place on the rails.

2. A one-piece built-in range as recited in claim 1 wherein the cooktop has a vertical backsplash along the back edge thereof, and the supporting flange at each side of the cooktop extends up the side edge of the backsplash, the front end of each supporting flange extending downwardly to give a rounded arm effect, and the top surface of each rail member follows the extent of the related supporting flange of the cooktop.

3. A cooking appliance having a top cooking surface that is adapted to be supported as a unit in a notched-out section of a top surface of a counter structure, the two opposite side edges of the cooktop each having a supporting flange extending outwardly therefrom, and a mating supporting rail member for each supporting flange, the rail member being adapted to be fixed to the edge of the notched-out section of a counter structure, whereby the appliance may be slid into place on the rails, the top surface of the rail member matching the contour of the cooperating supporting flange member to present a finished appearance between each supporting flange and rail member.

4. A cooking appliance having a top cooking surface that is provided with a plurality of heating units mounted therein, the appliance being adapted to be positioned in a notched-out section of a counter structure, the two opposite side edges of the cooktop each having an outwardly extending flange therefrom, and a supporting rail member for underlying each flange, each rail member being adapted to be fixed to the vertical side of the notched-out section of a counter structure, the front end of the rail member extending beyond the front edge of the counter structure, the front end of each flange extending downwardly over the front edge of the rail member to form a finished corner, the top surface of the rail member matching the contour of the underside of the cooperating flange, and fastening means on the appliance for engaging the rail members and holding the appliance fixed on the rail members.

References Cited
UNITED STATES PATENTS

| | | | |
|---|---|---|---|
| 3,028,605 | 4/1962 | Lander | 4—187 |
| 3,051,160 | 8/1962 | Nielsen | 126—37 |
| 3,142,295 | 7/1964 | Blee | 126—37 |
| 3,169,518 | 2/1965 | Scott | 126—39 |

FREDERICK L. MATTESON, JR., *Primary Examiner.*

E. G. FAVORS, *Assistant Examiner.*